United States Patent [19]
Connor

[11] Patent Number: 5,478,586
[45] Date of Patent: Dec. 26, 1995

[54] COFFEE, TEA OR BEVERAGE MAKER

[76] Inventor: Linda Connor, 87 Rutherford Ave., San Anselmo, Calif. 94960

[21] Appl. No.: 291,120

[22] Filed: Aug. 16, 1994

[51] Int. Cl.[6] .................................. A47J 31/18; A23L 1/20
[52] U.S. Cl. .............................. 426/431; 99/287; 99/297; 426/433; 426/435
[58] Field of Search ........................... 99/279, 287, 297; 426/433, 431, 435

[56] References Cited

U.S. PATENT DOCUMENTS

| | | | |
|---|---|---|---|
| 194,702 | 8/1877 | Mayerhofer | 99/297 |
| 1,873,023 | 8/1932 | Peirce | 99/297 |
| 1,982,846 | 12/1934 | Wales . | |
| 2,053,021 | 9/1936 | Cassol | 99/297 |
| 2,311,759 | 2/1943 | Johnson . | |
| 2,749,834 | 6/1956 | Hiscock | 99/297 |
| 3,370,524 | 2/1968 | Kasakoff . | |
| 3,657,993 | 4/1972 | Close . | |
| 3,906,847 | 9/1975 | Itasaka | 99/287 |
| 4,627,334 | 12/1986 | Shanklin | 99/306 |
| 4,997,015 | 3/1991 | Johnson . | |
| 5,168,793 | 12/1992 | Padamsee | 99/279 |

*Primary Examiner*—Robert W. Jenkins
*Attorney, Agent, or Firm*—Christensen O'connor Johnson & Kindness

[57] ABSTRACT

A container includes a cap having a press slidably mounted therein. At the distal end of the press is a filter and at the other end is a handle. A user places the press in the container and adds coffee grounds or tea leaves and hot water on top of the filter. The container, coffee grounds or tea leaves, and hot water are allowed to steep for a period of time. The user then pulls upward on the handle, moving the filter from a first brewing position to a second spent position in which the coffee grounds or tea leaves are trapped between the filter and cap. In the preferred embodiment, the press is then removed from the container and the user drinks the resulting coffee, tea or other beverage directly from the container.

8 Claims, 5 Drawing Sheets

COFFEE, TEA OR BEVERAGE MAKER

FIELD OF THE INVENTION

The present invention relates to methods and apparatus for making coffee, tea or other beverages using a loose material and a liquid.

BACKGROUND OF THE INVENTION

Coffee or tea has become the drink of choice for many individuals throughout the world. The popularity of coffee and tea continues to grow with no end in sight. As a result, many coffee and tea drinkers are seeking ways to improve the flavor and quality of the brewed beverage. Additionally, many coffee and tea drinkers enjoy activities such as backpacking, bicycle touring, foreign travel, and other activities which prohibit conventional brewing techniques.

Many coffee maker and teapot designs have been put on the market over the years, with varying amounts of success. However, no one produces an individual coffee or tea maker that is easy to use, convenient, small, lightweight, and durable enough to be used under any conditions. As an example, what can a backpacker in the mountains do if she desires a good cup of coffee or tea? She could use instant coffee, however, that is simply not an acceptable alternative to many coffee drinkers. Alternatively, she could carry a coffee pot in her backpack, but camp coffee pots are heavy and take a large amount of time and effort to use. A filter cone would inconvenience the user by requiring her to carry paper filters in addition to the ground coffee.

One popular method of making coffee or tea is to use a French coffee press. This type of coffee maker consists of a glass decanter having a cap with a coffee press slidably mounted within the cap. Ground coffee or tea leaves are placed within the decanter and hot water is added to the decanter. The coffee or tea and hot water are allowed to steep until the proper flavor is imparted to the beverage, according to the user's preference. A coffee press of the prior art includes a filter that closely fits the interior of the decanter. The press is pushed down through the hot liquid, collecting the used coffee grounds or tea leaves beneath the filter. When the filter reaches the bottom of the decanter, it traps the used coffee grounds or tea leaves between the filter and the bottom of the decanter. The resulting coffee or tea is poured out of the decanter into a mug for consumption.

French coffee presses produce high-quality coffee or tea, however, they suffer disadvantages making them inconvenient for many users: for example, in addition to the coffee press unit, the user must carry an additional mug from which to drink the beverage. Additionally, many users find that permitting the coffee grounds or used tea leaves to remain in the pot after brewing causes an unpleasant or bitter taste in the brewed beverage. Further, the coffee cools off quickly in a glass decanter, and for travel, the glass is a deterrent due to the risk of breakage.

It would be beneficial if a lightweight, easy-to-use, durable coffee or tea maker that reduced or eliminated some of the disadvantages of prior art coffee or tea makers was available.

SUMMARY OF THE INVENTION

The present invention is a coffee, tea or other beverage maker that includes a preferably nonbreakable container in which the coffee, tea or other beverage is made and from which the ground coffee, tea leaves or other loose material are removed at the termination of the brewing process, such that the removed loose material is sealed within the cap of the container. One embodiment of the invention includes a container that serves as both the container in which the coffee or tea is made and the container from which the user may drink the liquid. A cap is sized to fit in the mouth of the container and includes a hollow interior that defines the cavity. A press is slidably mounted within the cap, such that a filter located at the distal end of the press is moveable from a first position in which the filter lies approximately adjacent to the bottom of the container to a second position in which the filter lies adjacent to the underside of the cap and forms a seal between the filter and the cap.

In accordance with some aspects of the invention, the filter includes means for biasing the filter adjacent to the interior wall of the container in order to form a seal between the interior of the container and the filter. The filter includes a porous screen that is mounted on a disk having a plurality of cutouts. In an alternate embodiment, the filter approximates a basket shape. The screen is biased against the interior walls of the container by a spring mounted around the periphery of the disk.

In an embodiment of a method according to the present invention, a press having a filter located at the distal end is placed within a container. Ground coffee or tea leaves are placed within the container on top of the filter and hot water is poured into the container. The cap is placed in the mouth of the container and the container including the hot water and ground coffee or tea leaves is allowed to steep for a period of time until the resulting liquid acquires the proper flavor. The press is then drawn up such that the filter traps the coffee grounds and tea leaves in the cavity of the cap. The cap and press are then removed from the container and the resulting coffee or tea may be drunk directly from the container.

The present invention allows a user to make coffee, tea or other beverages without having to have both a coffee or tea maker and a separate mug from which to drink the resulting beverage. The invention is easy to use, and may also be formed of lightweight, durable materials allowing the invention to be advantageously carried in a backpack or used in other applications for which a coffee press of the prior art is unsuitable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
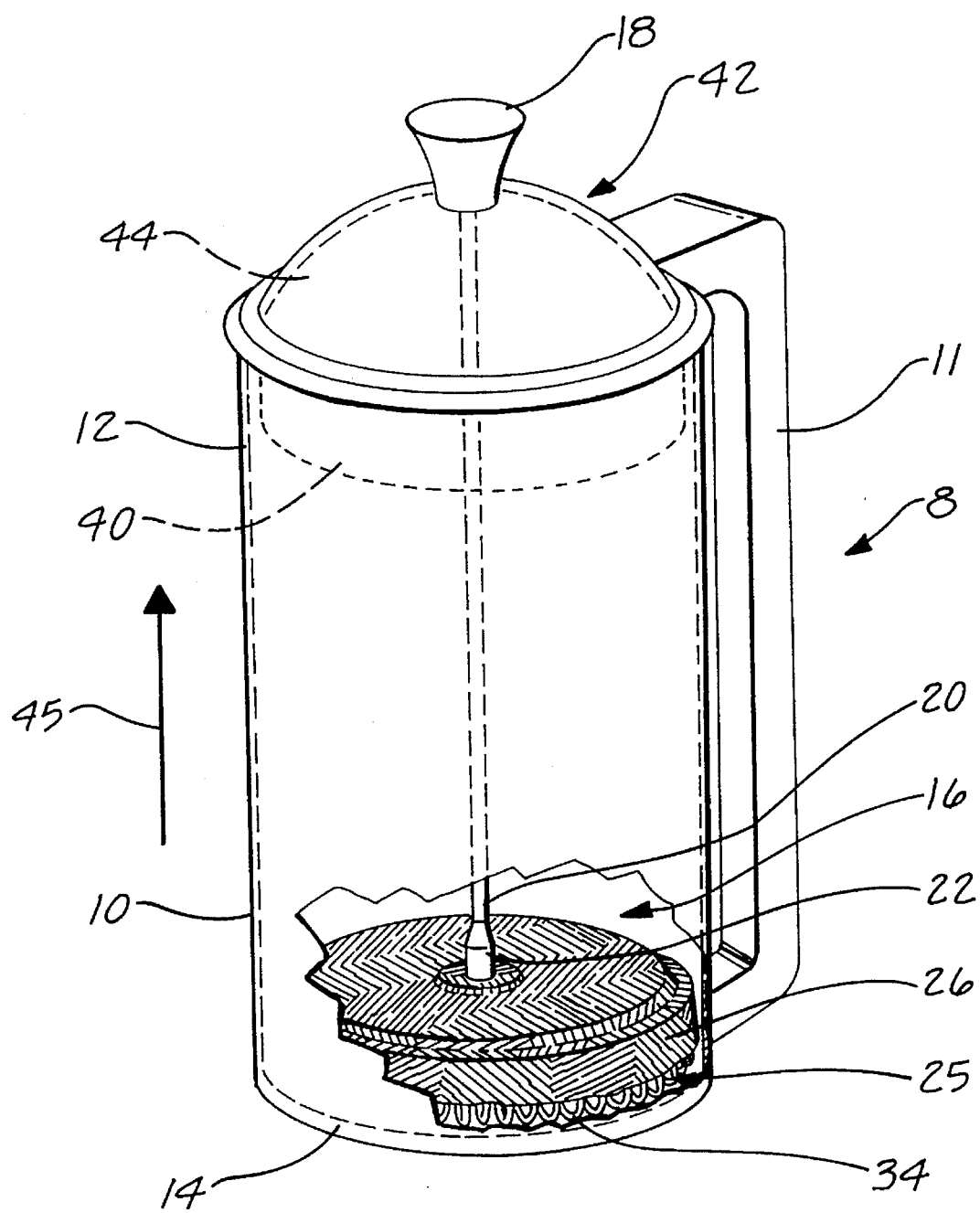
FIG. 1 is a perspective, partial cutaway view of a coffee or tea maker in accordance with the present invention.

A preferred embodiment of a coffee or tea maker 8 of the present invention including a container 10 in which the coffee or tea is made is illustrated in FIG. 1. The maker 8 may be used for making coffees, teas, or any other beverages that are produced by adding a loose material to a liquid and then removing the loose material from the liquid to produce the beverage.

The embodiments of the present invention illustrated in FIGS. 1–5 are intended for individual users and thus include containers 10 sized to contain an amount of beverage typically consumed in one serving by an individual user. Alternate embodiments could include containers that are smaller or larger in order to produce a lesser or greater amount of the beverage.

The container 10 illustrated is a cylindrical, thermally insulated mug that includes an open top or mouth 12 out of which the user drinks and a handle 11 that makes the container easier for the user to hold. A press generally labeled 16 (FIGS. 1 and 4) is slidably mounted within the container 10. The press 16 includes a cylindrical top or cap 42 that has a downwardly extending cylindrical lip 40 which is sized to fit into the mouth 12 of the container 10. The cylindrical lip 40 is sized to fit closely within the mouth 12 of the container 10, thus forming a seal between the lip 40 and the mouth 12 of the container. In the preferred embodiment, the center portion of the cap 42 arches upward to form a cavity 44 within the interior of the cap.

Figure 2:
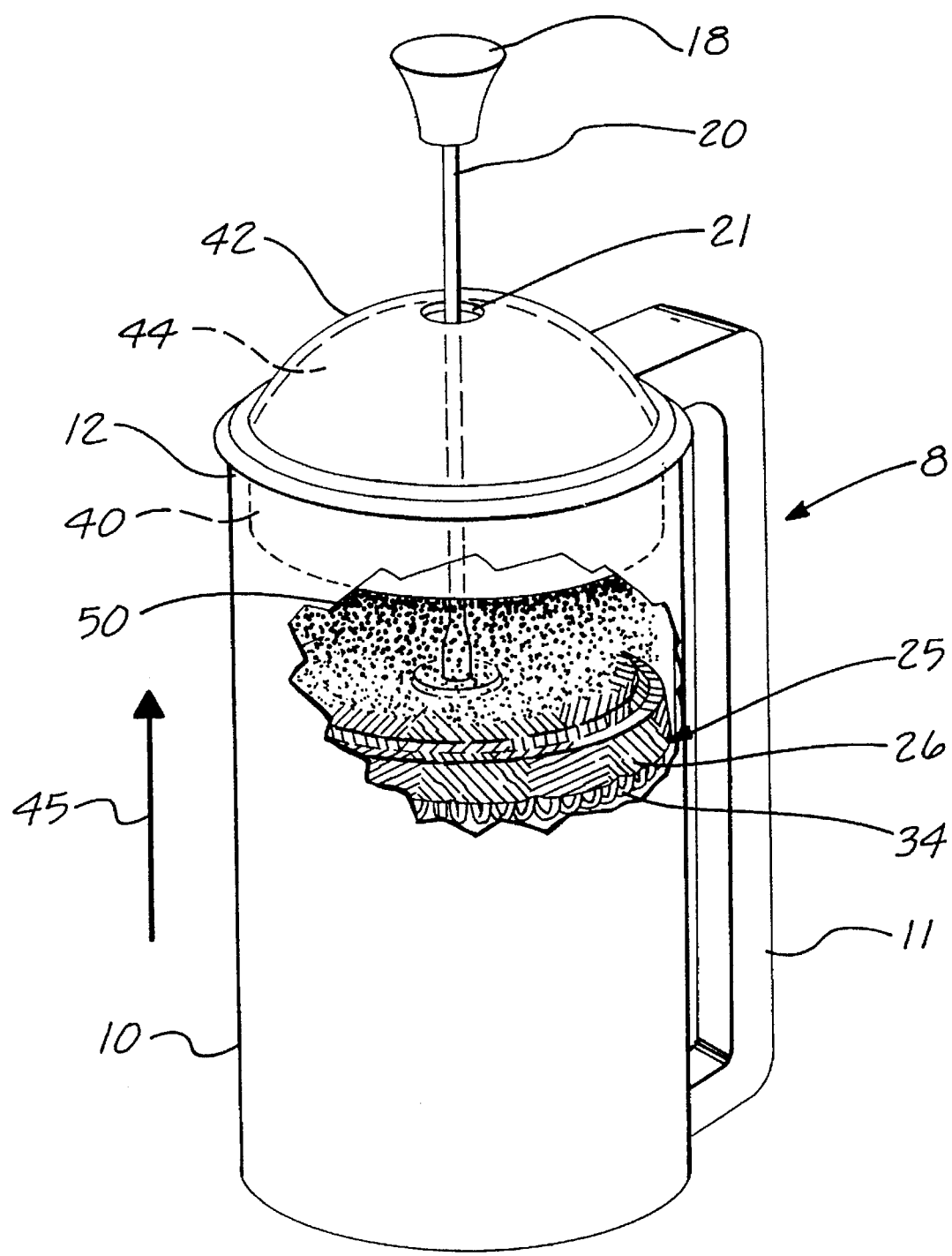
FIG. 2 is a partial cutaway view of the coffee or tea maker of FIG. 1 where the press is partially drawn up to the cap on the container.
Figure 4:
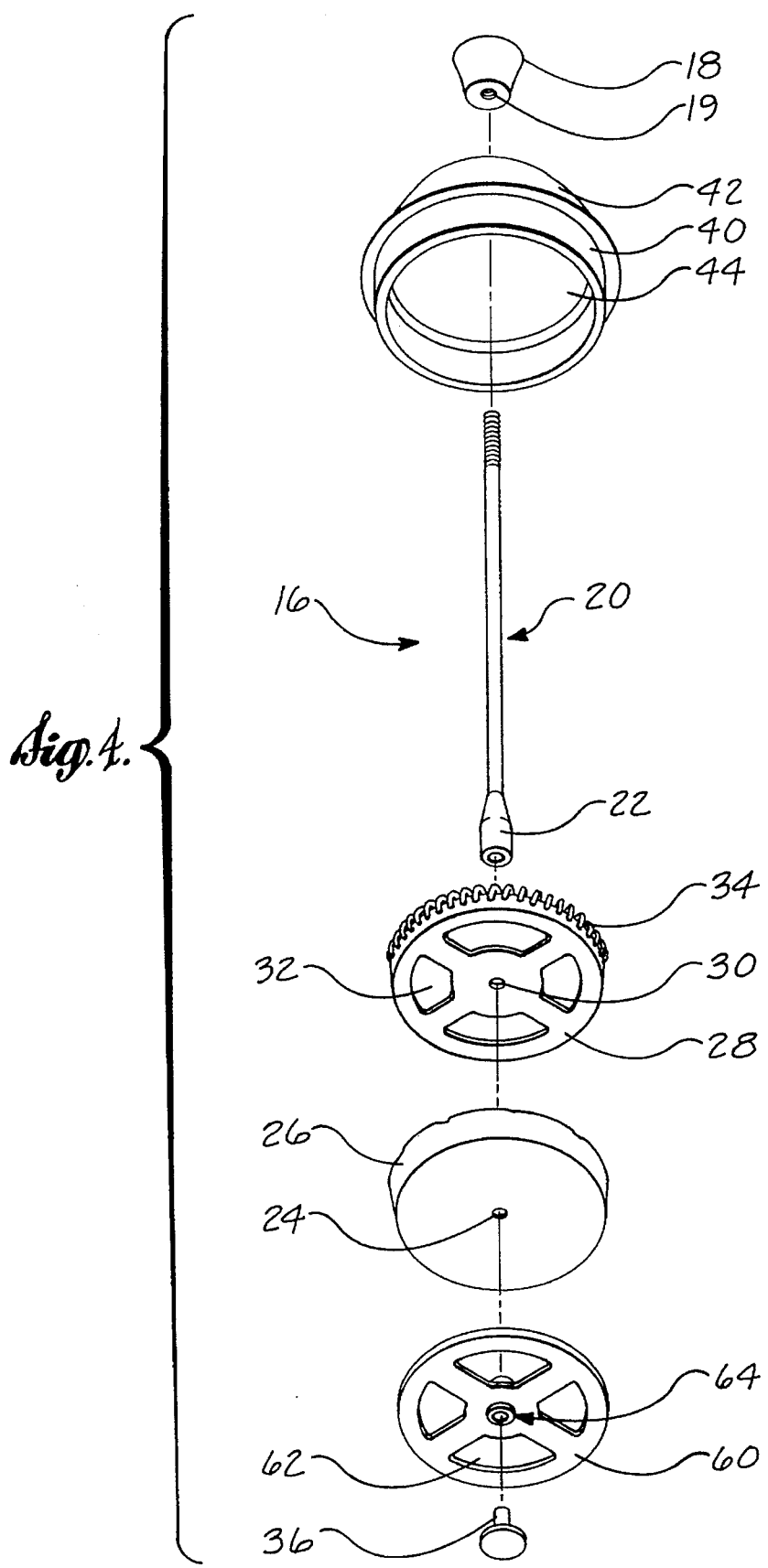
FIG. 4 is a partially exploded view of the press of FIG. 1.

The moveable parts of the coffee press 16 are slidably mounted in a hole 21 in the center of the cap 42 (FIG. 2). The press 16 includes a knob 18 located on the outside of the cap 42. The knob 18 allows the user to operate the press as described in detail below. The knob 18 includes a hole 19, extending up into the body of the knob, sized to receive a threaded cylindrical shaft 20. The proximal end of the shaft 20 extends through the hole 21 in the cap 42 and threads into the hole in knob 18. The cap 42 may include an O-ring gasket or other seal (not shown) around the hole 21 in order to seal the interface between the hole and shaft 20. The distal end of the shaft 20 includes a receptacle 22 that lies adjacent to and is connected to a cylindrical filter generally designated 25 (FIGS. 1 and 4). The diameter of the filter 25 is sized to closely fit within the interior of the container 10 in order to form a slidable seal between the interior walls of the container 10 and the periphery of the filter 25.

The filter 25 includes a porous circular screen 26 that has openings sized to allow liquid to pass through the screen without allowing the coffee grounds, tea leaves or other loose material 50 (FIG. 2) to pass through the screen during operation of the press 16. The screen 26 is sized so that it covers the top of a perforated disk 28 so that the edge of the screen extends down at least partially over the side of the disk 28, as best seen in FIGS. 1 and 2.

The disk 28 is circular and includes a series of cutouts 32 that allow liquid to pass through the disk. A biasing means comprising a coil spring 34 is mounted around the periphery of the disk 28. The coil spring 34 extends outward from the disk 28, and contacts the extending edge of the screen 26 and biases it outward into contact with the walls of the container 10 in order to form a seal between the container 10 and the filter 25. The screen 26 is pressed adjacent the disk 28 by a second disk 60. The second disk 60 is located underneath the screen 26 and includes a series of cutouts 62 that allow liquid to pass through the disk. The entire filter assembly consisting of disk 28, screen 26, and disk 60 are joined to the shaft 20 by a retainer 36 that extends through a hole 64 in disk 60, a hole 24 in screen 26, and a hole 30 in disk 28, and is received within the receptacle 22.

Alternatively, the screen 26 may be mounted or simply lie adjacent to the upper surface of the disk 28, eliminating the need for a second disk and making the filter assembly somewhat easier to clean.

Figure 3:
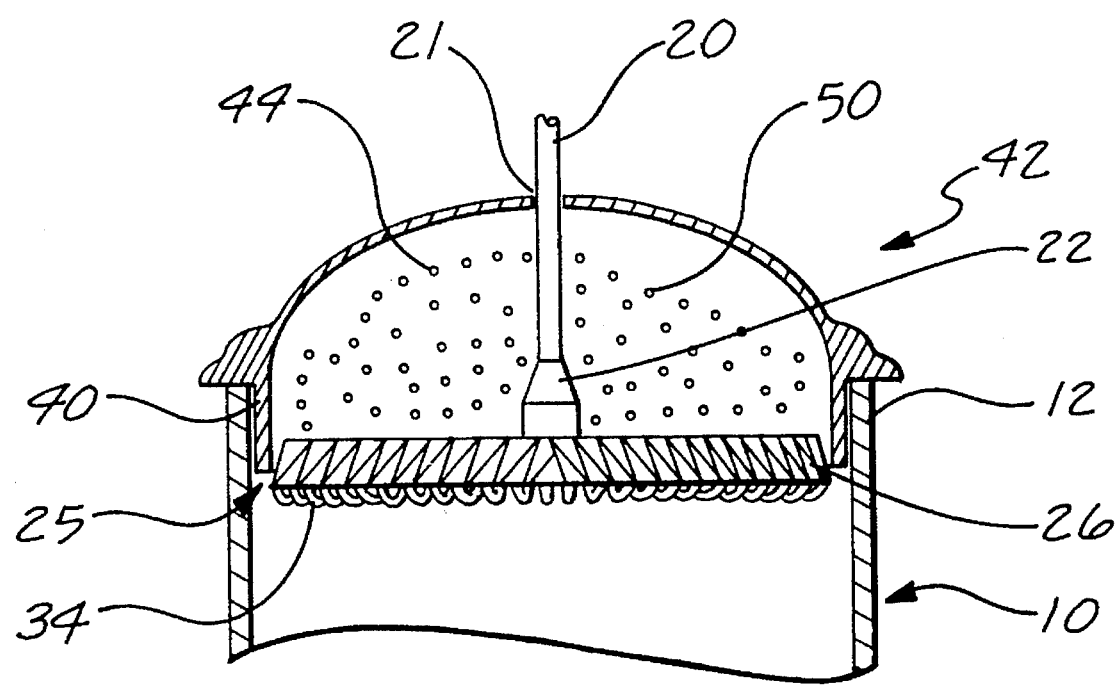
FIG. 3 is a partial cross-sectional view of the coffee or tea maker of FIG. 1 illustrating the press contacting the cap.

The press 16 is slidably mounted within the cap 42 such that the filter 25 is movable up and down within the interior of the container 10. As best illustrated in FIG. 1, in a first position, the filter 25 lies approximately adjacent to the bottom 14 of the container 10. The filter 25 is movable such that it may be drawn up within the interior of the container 10 by pulling on the handle 18 (FIG. 2) until the coffee filter 25 contacts and forms a seal with the cylindrical lip 40 of the cap 42 in a second position, as illustrated in FIG. 3.

In order to make coffee or tea with the maker 8, the user unscrews the knob 18 from the shaft 20, and slides the cap 42 off the shaft 20. Next, the user places the coffee filter 25 adjacent to the bottom 14 of the interior of the container 10. Ground coffee, tea leaves, or another loose material are placed within the interior of the container 10 on top of the coffee filter 25, and hot water is added to the container 10. Next, the cap 42 is placed tightly within the mouth 12 of the container 10, placing the shaft 20 back within the hole 21 in the cap 42. The user screws the knob 18 onto the shaft 20. Alternatively, the user may elect not to unscrew the knob 18 and slide the cap 42 off the shaft 20, but simply remove the cap 42 from the mouth 12 of the container 10 and displace the cap 42 sufficient to place the loose material into the container 10 on top of the coffee filter 25, and to add the hot water. In either case, the container 10 is then set aside until the ground coffee, tea leaves, or other material impart the desired flavor to the liquid within the container.

After sufficient time has passed, the user pulls up on knob 18, thus causing the filter 25 to move upward within the interior of the container 10. As the filter 25 moves upward, as illustrated in FIG. 2, the coffee grounds, tea leaves, or other loose material 50 are trapped above the filter 25 as liquid flows through the filter into the bottom of the container 10. The knob 18 is pulled up until the extending edge of the screen 26 contacts and forms a seal with the cylindrical lip 40 of the cap 42, sufficient to trap the loose material 50, as shown in FIG. 3. In this upwardmost position, the filter 25 traps the used coffee grounds, tea leaves or other loose material 50 within the cavity 44 of the cap 42.

After drawing the filter up into contact with the cap 42, the user continues to pull up, thus removing the entire press 16 from the mouth 12 of the container 10. The user may then hold the press 16 over a disposal container and press down on the knob 18 in order to break the seal between the filter 25 and cap 42, thus allowing the coffee grounds, tea leaves or other loose material 50 to fall into the disposal container. After withdrawing the press 16 from the container 10, the user may drink and enjoy the beverage remaining within the container 10 directly from the container.

In the preferred embodiment, the container 10 is a thermal insulated mug and the cap 42 is formed of a durable plastic material. However, other types of containers and other materials could be used to form the present invention, for example, the mug itself could be fashioned from plastic, stainless steel, anodized aluminum, or similar materials, with thermal insulation. In appropriate circumstances, the mug could be formed of ceramic material or glass. In particular, the handle 11 may be omitted from the container 10 to save space and decrease the size of the maker 8.

The present invention allows a coffee or tea drinker to enjoy a high quality cup of coffee or tea wherever hot water is available. It is easy to use, lightweight, durable, and requires a small amount of storage space. The present invention allows a coffee or tea drinker to enjoy a high-quality brewed beverage without having to always carry a coffee or tea maker and a separate mug from which to drink.

Figure 5:
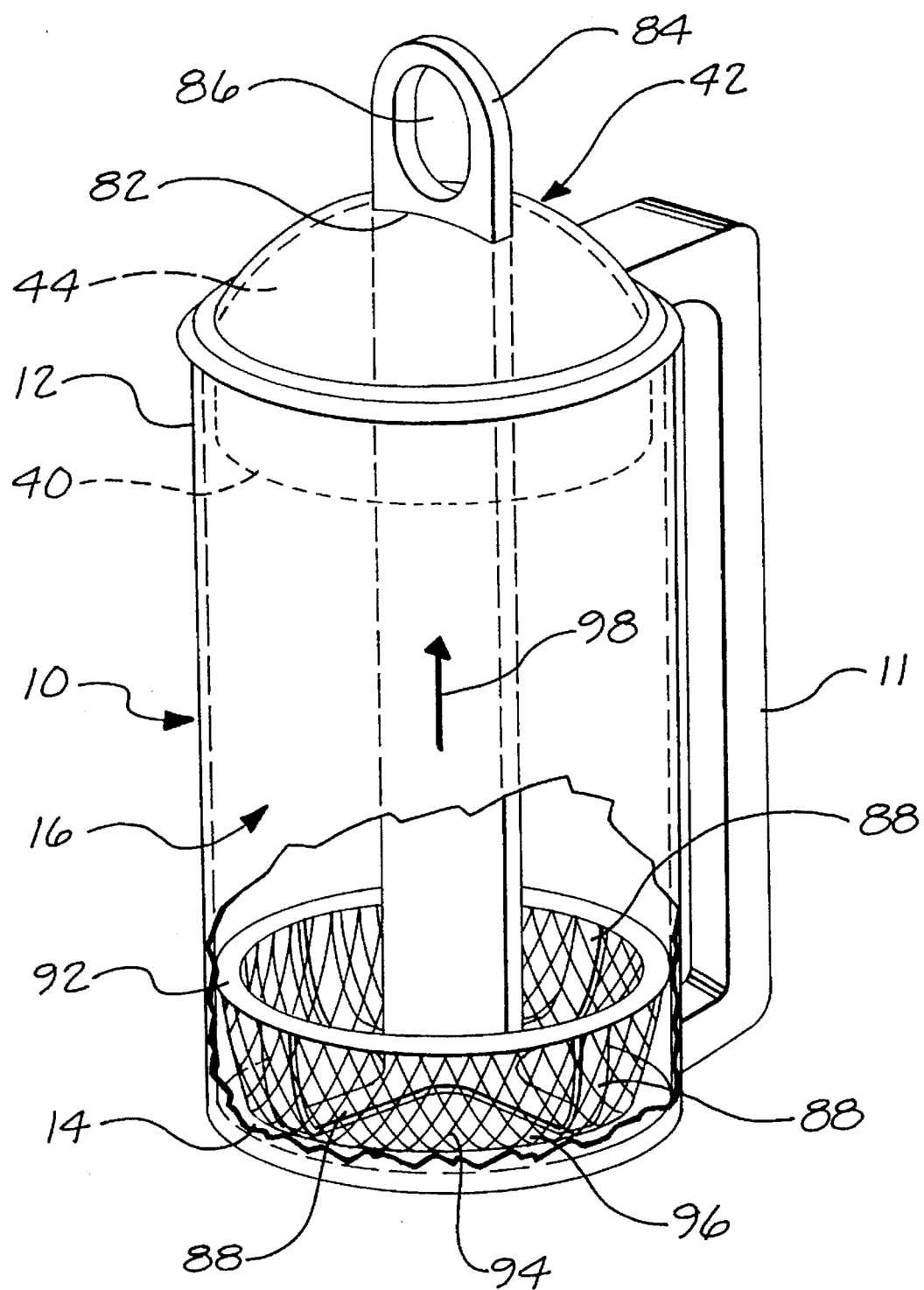
FIG. 5 is a perspective, partial cutaway view of an alternative embodiment of a coffee or tea maker according to the present invention.

An alternate embodiment of the press 16 illustrated within the container 10 is shown in FIG. 5. Features of this alternate embodiment not described below function similarly to features of the first embodiment, and may be understood by reference to the discussion of the first embodiment.

In this alternate embodiment, in place of the circular shaft 20 and knob 18 is a shaft 84 having a rectangular cross section. Due to the shaft's rectangular cross section, the circular hole 21 in the cap 42 is replaced by a rectangular slot 82. The proximal end of the shaft 84 includes a cutout 86 that allows the user to place a finger through the shaft 84 in order to move the shaft up or down within the container 10. This alternate embodiment shown in FIG. 5 is presently believed to be the best mode contemplated of carrying out the present invention. One advantage of this alternate embodiment is that, because the cap 42 will clear the shaft 84, the user need not unscrew a knob in order to remove the cap 42, which makes this alternate embodiment easier to use and eliminates the risk of losing the knob.

In this alternate embodiment, the filter of the first and second embodiments is replaced with a filter consisting of a basket 94. The dimensions of the basket 94 are defined by four arms 88 equiangularly spaced around the basket 94 and extending radially outward from the shaft 84. The arms 88 extend radially outwardly approximately to the walls of the container 10 and then extend upwardly where they terminate and connect to a cylindrical rim 92. A circular gasket, not shown, may be sized to fit around the surface of the rim 92 to direct the coffee grounds, tea leaves, or other loose material into the lid. The rim 92 is sized to form a seal between the basket 94 and the interior walls of the container 10. The exterior surface of the basket 94 is covered by a porous filter material 96 that allows liquid to pass through the basket, but traps coffee grounds, tea leaves or other material above the basket.

In a manner similar to that described with respect to the first embodiment, the container 10 is filled with coffee grounds or tea leaves and hot water and allowed to stand. After a sufficient amount of time has passed, the user pulls up on the shaft 84, as shown by arrow 98, until the rim 92 of the basket contacts and forms a seal with the lip 40 of the cap 42, which seal is sufficient to trap the coffee grounds, tea leaves or other loose material 50 within the basket and cavity 44.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A beverage maker for brewing a beverage from loose material steeped in a liquid, the beverage maker comprising:

a container having a top-opening mouth for receiving a quantity of the liquid;

a cap sized to fit on the mouth of the container, the interior of the cap defining a cavity; and a press having a filter unit for supporting a quantity of the loose material, the press being slidably mounted within the cap for movement between a brewing position in which the filter unit lies approximately adjacent to the bottom of the container for steeping the loose material in the liquid and a spent position in which the filter unit lies adjacent to the bottom of the cap, the filter unit being sized to form a seal between the filter unit and the cavity within the cap when the press is in the spent position.

2. The maker of claim 1, wherein the filter unit includes a flexible filter and means for biasing the flexible filter adjacent to the interior wall of the container.

3. The maker of claim 1, wherein the filter unit has an approximately flat upper surface.

4. The maker of claim 1, wherein the filter unit forms a basket.

5. The maker of claim 1, wherein the filter unit includes a disk having a plurality of cutouts and a porous screen mounted on the disk.

6. The maker of claim 5, wherein the filter unit includes a spring, located on the periphery of the disk, that biases the peripheral margin of the screen against the interior wall of the container.

7. The maker of claim 5, wherein the porous screen lies adjacent to the upper surface of the disk.

8. A method for brewing a beverage from loose material steeped in a liquid, comprising:

placing a press including a filter unit in a container having a top-opening mouth, the filter unit being sized to contact the sides of the container;

placing a cap sized to fit the top-opening mouth on the container, the interior of the cap defining a cavity and the filter unit being sized to form a seal with the cavity when the filter unit is adjacent the cap;

placing a quantity of the loose material within the container on top of the filter unit;

moving the filter unit to a position adjacent to the bottom of the container;

pouring a quantity of the liquid into the container;

allowing the loose material to steep in the liquid;

removing the loose material from the liquid by moving the filter unit upward out of the liquid in the container; and removing the loose material from the container by moving the filter unit upward into contact with the cap to form a seal between the filter unit and the cavity in the cap.

\* \* \* \* \*